INVENTORS
Elmer R. Worth, Sr.
George C. Maithonis
BY Oliver D. Olson
Agent

INVENTORS
Elmer R. Worth, Sr.
George C. Maithonis
BY
Oliver D. Olson
Agent

United States Patent Office 3,202,894
Patented Aug. 24, 1965

3,202,894
FINE AND COARSE MOTOR CONTROL SYSTEM WITH ANTI-BACKLASH FEATURES
Elmer R. Worth, Sr., 1065 Glen Creek Drive NW., Salem, and George C. Maithonis, Salem, Oreg.; said Maithonis assignor to said Worth, Sr.
Filed Aug. 14, 1961, Ser. No. 131,346
12 Claims. (Cl. 318—28)

This invention relates to control systems, and more particularly to an electrical system capable of controlling from a remote position the adjustable elements of sawmill edgers, resaws, and the like.

It is principal object of the present invention to provide a control system for sawmill edgers and the like, which system is capable of controlling a plurality of members simultaneously.

Another important object of this invention is the provision of a setworks which functions, in the adjustment of a movable member relative to a reference, to approach the final set point always from the same direction, whereby to eliminate errors due to slack and other factors in the moving mechanism.

Still another important object of the present invention is the provision of a setworks which functions, in the adjustment of a movable member relative to a reference, to move the member at high speed for a major portion of its travel and then to approach the final set point at a slower speed, whereby to achieve maximum speed and precision of operation.

A further important object of this invention is to provide a setworks for edgers, resaws, and the like apparatus, which setworks is capable of operation from either side of the apparatus whereby to accommodate all types of plant installations.

A still further important object of the present invention is to provide a remote control system which is of relatively simplified construction for economical manufacture and maintenance.

The foregoing and other objects and advantages of this invention will appear from the following detailed description, taken in connection with the accompanying drawings in which.

In its general concept the control system of the present invention involves the development of an electric signal representing a desired and predetermined physical property, and the development of a matching electric signal by a signal producing element which is responsive to said physical property, the matching signals thus functioning to establish the physical quantity desired.

Although it will be understood that the control system of this invention may be utilized in connection with the control of diverse forms of physical properties, such as light, heat, weight, and others, the system is described hereinafter in the form of a setworks for the control of distances of movement of members relative to a reference.

Figure 1:
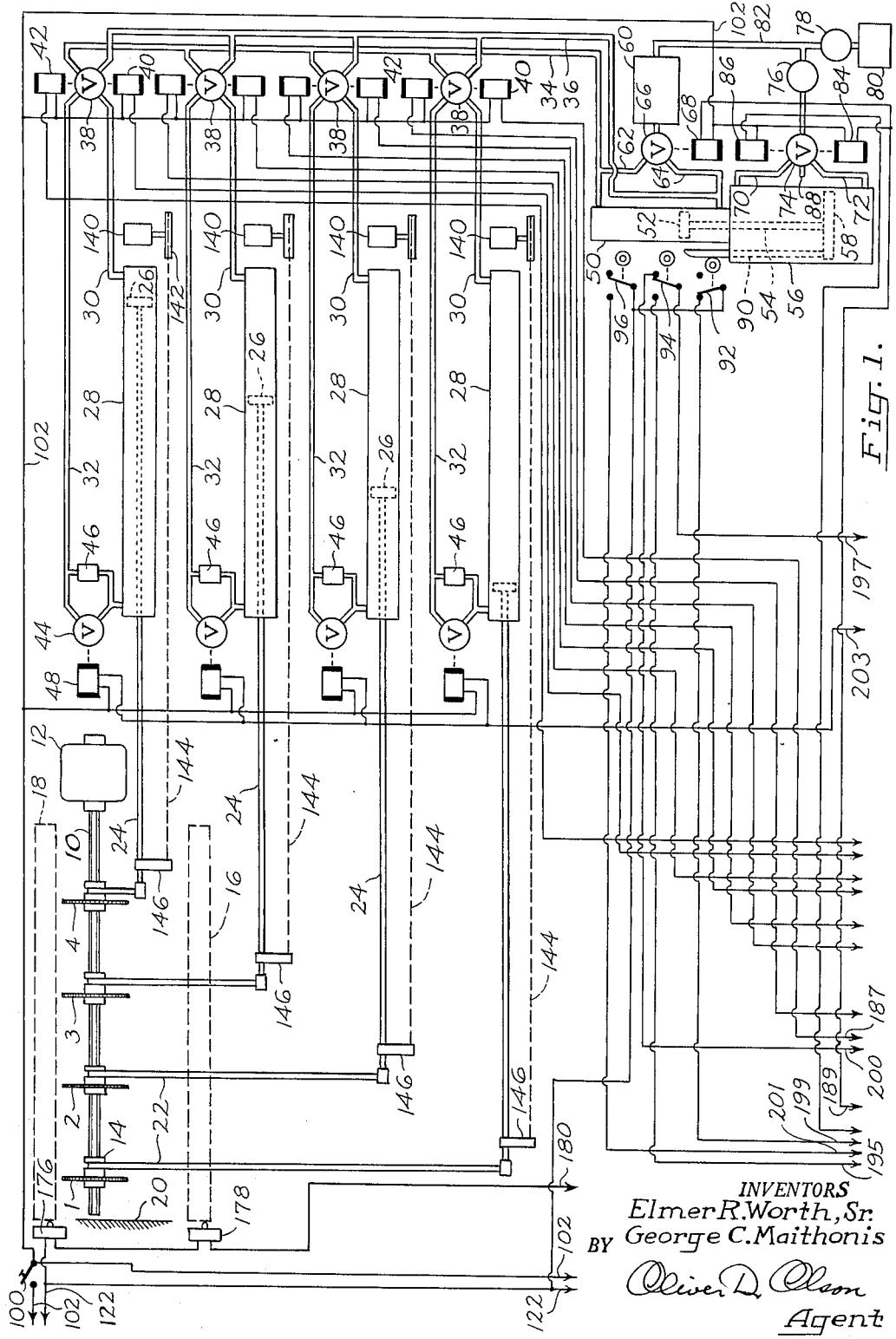
FIG. 1 is a schematic diagram of a sawmill edger in association with components and electrical circuitry of a setworks embodying the features of this invention.

The edger illustrated schematically in FIG. 1 includes an elongated splined or otherwise keyed rotary shaft 10 driven by a motor 12. A plurality of circular saws 1, 2, 3, 4 are removably mounted on separate hubs 14 which are supported on the splined shaft for rotation therewith and for independent adjustment along the length of the shaft. The saws overlie a feed table assembly which includes an infeed roll 16, an outfeed roll 18, and a reference straight edge 20 against which a corresponding edge of lumber slidably engages as it passes beneath the saws. The infeed and outfeed rolls generally are mounted resiliently above the feed table for vertical deflection by lumber passing through the edger.

In the arrangement illustrated in FIG. 1 the straight edge 20 is positioned adjacent the left end of the saw shaft 10, and therefore it is general practice for the four saws to be identified, from left to right, as Nos. 1, 2, 3 and 4. It will be understood that if the straight edge were positioned adjacent the right end of the shaft, the numbering of the saws would be reversed.

Ordinarily, adjustment of the saws relative to each other and to the straight edge is performed by manual manipulation of handles 22 which project rearwardly from the saw hubs 14. An index pointer is associated with each handle, and the pointers cooperate with a scale extending from the straight edge parallel to the shaft, for adjusting each saw to a predetermined position.

In accordance with the present invention, the conventional handles may be utilized to connect each saw hub to a source of power for moving the saw along the shaft. In the embodiment illustrated, the outer end of each handle is connected to the outer end of an elongated piston rod 24, the inner end of which is connected to a piston 26 contained slidably within an elongated hydraulic power cylinder 28.

In FIG. 1, the handles 22 are shown diagrammatically as being of varying length, for simplification of the drawing. However, in practice the power cylinders 28 are arranged in vertical pairs so that the coupling between the piston rods and saw hubs are of minimum length.

Each hydraulic cylinder communicates at its opposite ends with an infeed conduit 30 and an outfeed conduit 32. By infeed and outfeed is meant the direction in which the piston 26 moves relative to the reference straight edge 20. The infeed and outfeed conduits of each cylinder are connected selectively to hydraulic conduits 34 and 36, through an electrically actuated valve 38. These conduits function interchangeably as hydraulic fluid supply and return lines. In the embodiment illustrated, in infeed solenoid 40 and an outfeed solenoid 42 are associated with each valve, the valve construction is such that when the infeed solenoid is energized the infeed conduit 30 is connected either to supply line 34 or to supply line 36 and the outfeed conduit 32 is connected either to supply line 36 or to supply line 34, and when both solenoids are deenergized all conduits are closed from each other.

The outfeed conduit 32 also includes an electrically actuated valve 44 which is bypassed by a mechanically adjustable restricter valve 46. A solenoid 48 is associated with the valve 44, and the latter is arranged such that when the solenoid is deenergized the valve is completely open for unrestricted flow of hydraulic fluid through it, and when energized the valve is completely closed, requiring that hydraulic fluid flow through the restricter valve 46. In this manner, the piston 26, and hence the associated straight edge, may be caused to move toward the saw either at a fast rate or at a slower rate, as explained more fully hereinafter.

The conduits 34, 36 communicate with opposite ends of a master hydraulic pump cylinder 50 which slidably contains the piston 52 whose rod 54 extends rearwardly into the air cylinder 56 for attachment to the air piston 58. It will be understood that the size of the hydraulic and air cylinders are much larger than illustrated, since the system must accommodate movement of the saw pistons 26 through the substantial length of their associated cylinders 28.

Hydraulic fluid is supplied to the opposite ends of the hydraulic pump cylinder 50 from the accumulator tank 60, through the conduits 62, 64 and the interposed electrically actuated valve 66. This valve is controlled by the solenoid 68 and is arranged in such manner that, as the piston 52 moves in the forward direction toward conduit 34 the valve closes the conduit 62 from the accumulator tank and opens the conduit 64 to the accumulator tank. Conversely, as the piston 52 moves in the rearward direction, the valve opens the conduit 62 to the accumulator tank and closes the conduit 64 from the tank.

The air cylinder 56 communicates at its opposite ends through the conduits 70, 72 and the electrically actuated valve 74, lubricator 76 and filter-regulator 78, with a source 80 of compressed air. This source of compressed air also may be supplied to the accumulator tank 60, through the conduit 82, to pressurize the hydraulic fluid in the tank.

The air valve 74 is controlled by the infeed solenoid 84 and outfeed solenoid 86, and is so arranged that when compressed air is being admitted to one end of the air cylinder, the air on the opposite side of the air piston is exhausted to the atmosphere through the exhaust outlet 88. The infeed and outfeed solenoids are so designated in relation to the direction of movement of the air piston 58 with respect to the hydraulic pump 50.

The air and hydraulic power system has been chosen herein for its greater reliability and low maintenance cost, as compared with conventional fully hydraulic power systems. The latter and other power systems may be used, however.

Since the saw power cylinders 28 are of substantial length, requiring a substantial volume of hydraulic fluid, and since it is desirable that the air and hydraulic power system be as small as possible, means is provided for automatically reversing the direction of movement of the pistons in the air and hydraulic power supply when the pistons have moved more than one-half the distance in one direction. In the embodiment illustrated, an elongated arm 90 is connected at one end to the air cylinder piston 58 and the opposite end projects through an opening in the air cylinder, a pressure tight seal being provided between the arm and opening in well known manner. The outer end of the arm is arranged to selectively engage the plungers of an infeed microswitch 92 positioned adjacent the rearward end of the hydraulic pump cylinder, a central microswitch 94 positioned midway between the opposite ends of the hydraulic pump cylinder, and an outfeed microswitch 96 positioned adjacent the forward end of the hydraulic pump cylinder. As explained more fully hereinafter, these microswitches function to sense the position of the hydraulic pump piston 52 along the length of the cylinder 50 and to control the direction of further movement of the piston.

The electrical circuitry associated with the components described hereinbefore is best described in conjunction with the operation of the edger and setworks assembly. For purposes of this description let it be assumed that all saws are spaced four inches apart and that the No. 1 saw is spaced four inches from the reference straight edge 20. Let it also be assumed that it is desired to move the No. 1 saw to a position two inches from the reference straight edge, the No. 2 saw six inches from the No. 1 saw, the No. 3 saw six inches from the No. 2 saw, and the No. 4 saw four inches from the No. 3 saw.

The on-off switch 100 in the main line 102 is closed to energize the apparatus. The circuit of the time delay relay 104 (FIG. 2) is completed from the main line 102 through said relay, thence through line 105 and any of the normally closed contacts C (FIG. 3) of the inactivated set selector relays, 106, 108, 110, 112, 114, 116, 118 and 120 to the other main line 122. The contact A associated with the time delay relay 104 transfers from the normal position illustrated to the activated position. The error setting relay 124 (FIG. 2) also is activated by completion of the circuit from the main line 102 through said relay and the normally closed contact D of the inactivated voltage sensing relay 126, back to the other main line 122. The contacts A, B, C, D, E and F associated with the relay 124 transfer from the normal position illustrated to their activated positions, and contact A serves to complete an alternate circuit for its relay, through the line 105 and the normally closed contacts C of the set selector relays. This alternate path permits activation of the voltage sensing relay without deactivating the error setting relay.

Since, in the embodiment illustrated, the reference straight edge 20 is located to the left of the No. 1 saw, the straight edge selector switch 130 (FIG. 3) is closed to energize the straight edge selector relay 132, whereby to transfer its associated contacts A, B, C, D, E, F, G and H to the positions illustrated. The positions of these contacts determine the reference end of the set selector resistances now to be described.

Figure 3:
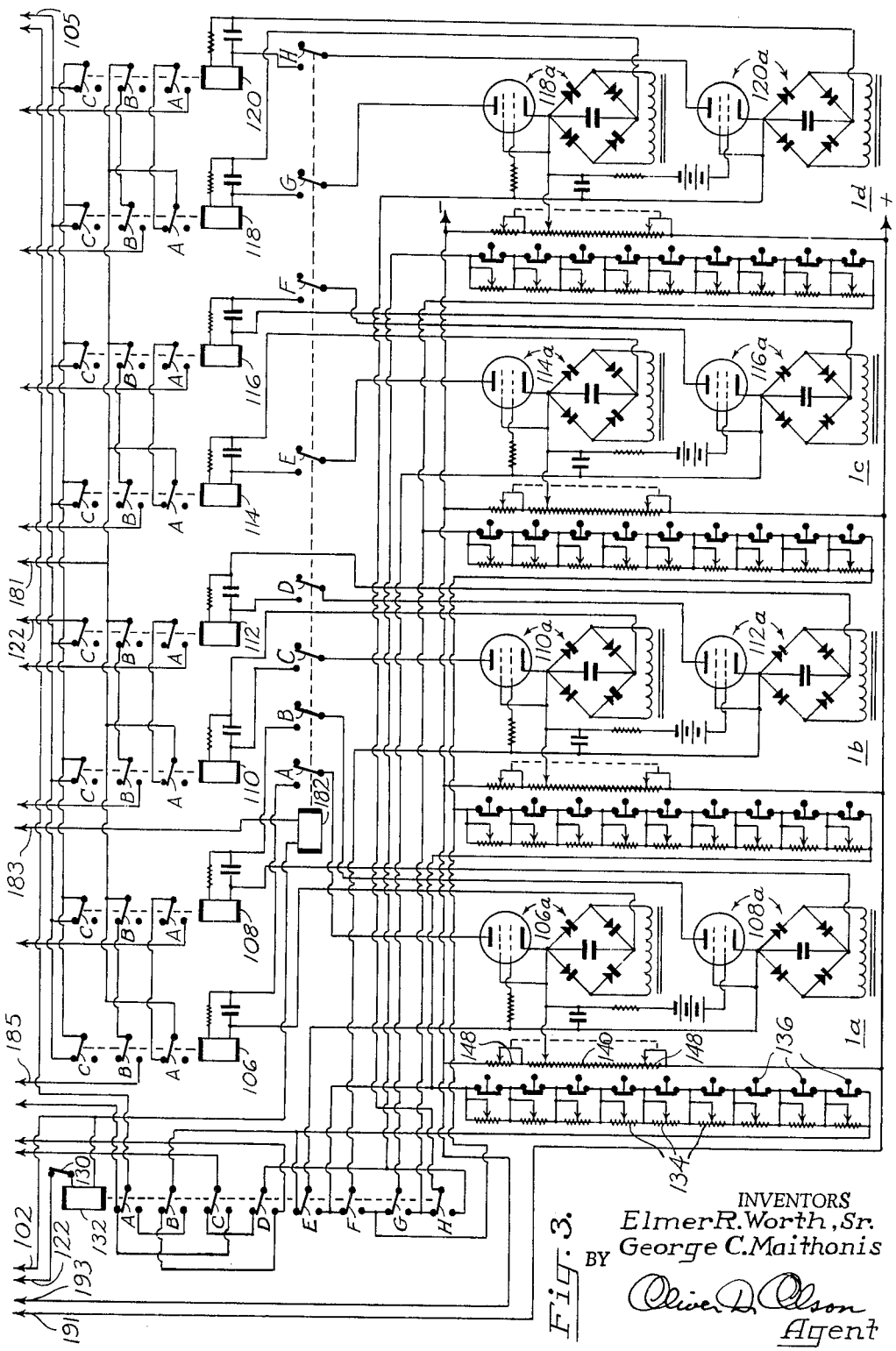

Associated with each saw 1, 2, 3 and 4 is a set selector assembly 1a, 1b, 1c and 1d, respectively (FIG. 3). In the embodiment illustrated, each assembly includes a plurality of series connected resistances 134 each normally shunted by the normally closed selector push button switches 136. Each resistance is chosen in value to provide a predetermined voltage which represents a predetermined distance of movement of its associated saw. For example, the resistances in the series chain may be chosen to represent the following distances of movement of the associated saw, reading upward from the bottom of the chain: ⅛″, ¼″, ½″, 1″, 2″, 3″, 4″, 10″ and 20″. These numerals preferably are carried on the corresponding push buttons. This arrangement affords the selection of a vast number of settings, by the appropriate selection of one or more of the push buttons. To illustrate, a setting of 5⅞″ is provided by depressing the push buttons identified as ⅛, ¼, ½, 1, and 4. The individual resistors may be of the variable type, as illustrated, to accommodate changing of setting distances, as will be apparent. Alternatively, the series chain of resistances may be replaced by a continuous potentiometer.

Associated with each selector chain is a detection potentiometer 140. Referring to FIG. 1, each potentiometer is positioned adjacent its associated saw power cylinder 28, and its rotatable element, whether the resistance or the sliding contact, is connected to a rotary shaft carrying the pulley 142. A cable 144 is secured at one end to the pulley and the opposite end is attached by the bracket 146 to the associated piston rod, adjacent the forward end of the latter. It will be understood that the pulley shaft is spring biased to reel in the cable as the pitson rod retracts into its cylinder.

The opposite ends of the potentiometer 140 may be connected to a pair of trimmer potentiometers 148 (FIG. 3) mechanically ganged together as indicated by the dotted line, to provide minute adjustment for each saw. The potentiometer assemblies are connected together in parallel and connected to a source of direct current, as indicated.

In accordance with the present illustration, the 2″ selector push button 136 for the No. 1 saw is depressed for moving the saw inward from its position four inches from the reference straight edge 20 to the desired position two inches from the straight edge; the 2″ and 4″ selector push buttons for the No. 2 saw are depressed for moving the No. 2 saw six inches from the No. 1 saw; and the 2″ and 4″ selector push buttons for the No. 3 saw are pushed to move the No. 3 saw six inches from the No. 2 saw. Since the No. 4 saw was originally four inches from the No. 3 saw, the 4″ selector push button for the No. 4 saw already has been depressed, and this will provide for maintaining the four inch spacing between the No. 3 and No. 4 saws.

Having selected the proper push buttons for the desired saw settings, the change position push button switch 150 (FIG. 2) now is depressed. Closure of its contact 152 thus completes the electric circuit of the set control relay 154 from the main line 102 through said relay and said closed contact 152, thence through the normally closed homing contact 156 associated with the motor driven cam 158, thence through the transferred contact A of the time delay relay 104 to the other main line 122. The contacts A, B, C, D and E associated with the set control relay thus transfer from the positions illustrated, and contact A provides a holding circuit for the relay by bypassing the change position switch contact 152 and the homing contact 156.

Transferred contact E of the set control relay 154 completes the electric circuit of the voltage sensing relay 126, which circuit includes the rectifier 160 and voltage sensing thyratron tube 162. However, since the tube is not conducting, the relay is not yet energized.

Contact B of the inactive voltage sensing relay completes the circuit of the voltage make-up motor 164, from the main line 102 through said motor and untransferred contact B thence through the transferred contact B of the set control relay 154 and the transferred contact A of the time delay relay 104 to the other main line 122. The electric circuit of the motor brake 166 is not completed, since contact B of the inactive voltage sensing relay 126 has not transferred. Accordingly, the motor is energized and its output shaft 168 driven, causing rotation of the homing cam 158 and also the rotary contact 170 of the voltage make-up potentiometer 172.

Upon rotation of the homing cam, the homing contact 156 transfers to provide a holding circuit for the motor by bypassing contact B of the set control relay 154. This permits the motor ultimately to continue rotating back to its homing position to complete the cycle of operation, as explained more fully hereinafter.

The voltage makeup potentiometer 172 is arranged in series with the series connected chains of selector resistances 134. This series assembly comprises one leg of a bridge circuit, another leg of which includes the reference potentiometer 174. This reference potentiometer is adjusted to provide a total voltage drop corresponding to the total length of the edge opening, i.e., the maximum distance between the reference straight edge 20 and the farthest position of the No. 4 saw. For example, let it be assumed that the edge has a full opening of forty inches and that the reference resistance is adjusted to provide a 400 volt drop across it, thus providing a 10 volt drop per inch of saw travel. Accordingly, the spacings of two, six, six and four inches of the four saws totals eighteen inches, or 180 volts. The voltage makeup motor 164 operates until the sliding contact 170 on the voltage makeup potentiometer 172 reaches a point at which an additional 220 volts is added. With the reference resistance 174 connected through contact A of the sensing relay 126 to the cathode of the tube 162 and the aforesaid series assembly connected to the grid of the tube, the latter will fire when the voltages approach matching. Activation of this tube thus completes the circuit of the voltage sensing relay 126, transferring its contacts A, B, C and D from the positions illustrated, the transfer of contact A opening the bridge circuit.

Transfer of contact B of the voltage sensing relay 126 opens the circuit of the motor 164 and completes the circuit of the motor brake 166, thus holding the voltage makeup potentiometer contact 170 in the adjusted position attained.

Transfer of contact C of the voltage sensing relay 126 completes the electric circuit from the main line 122 through the edger roll limit switches 176, 178 (FIG. 1) and line 180, through said contact C and line 181 to the contacts B of the various set selector relays 106–120, preparatory to their selective activation for operation of the appropriate solenoids 40, 42, associated with the hydraulic control valves 38 of the saw power cylinders 28.

Transfer of contact D of the voltage sensing relay 126 completes the electric circuit of the set complete relay 182 (FIG. 3) from the main line 102 through said relay and line 183 and the transferred contact B of the error setting relay 124, thence through the transferred contact D of relay 126 to the other main line 122. The contacts A, B, C, D, E, F, G, and H associated with the set complete relay thus are transferred from the positions illustrated to complete the electric circuits of the various set selector 106–120 relays, each circuit including the rectifier and thyratron tube assembly 106a–120a, respectively.

It will be remembered that the No. 1 saw has been positioned initially four inches from the reference straight edge 20, and it had arrived at that position by the matching of the resistance 134 in the No. 1 saw selector chain (established by depressing the 4" push button) with the associated detection potentiometer 140, driven by the No. 1 saw power unit piston rod 24. These matching resistances cause the firing of one of the thyratron tubes 106a or 108a and consequent activation of the appropriate valve solenoid 40 or 42, in the manner which will be apparent hereinafter.

Since we now wish to move the No. 1 saw toward the reference straight edge 20 from its four inch distance to a two inch distance, the present position of the contact of the detection potentiometer 140 is such that the cathode of the upper thyratron tube 106a is more negative than its grid, whereas the cathode of the bottom tube 108a is more positive than its grid. Accordingly, the bottom tube will not conduct and the top tube will conduct, causing activation of the set selector relay 106 and transferring of its contacts A, B and C from the positions illustrated. Transfer of contact B completes an electric circuit from the main line 122 through the edger roll limit switches 176, 178 and the transferred contact C of the voltage sensing relay 126, thence through line 181 and the untransferred contact B of inactive set selector relay 108, through the transferred contact B of 106, thence through line 185 and the untransferred contact E of inactivated drive direction relay 186, through line 187 and the infeed solenoid 40 associated with the hydraulic control valve 38 of the No. 1 saw power cylinder 28 to the other main line 102. The control valve thus is moved from its neutral, closed position to interconnect the associated conduits 30, 34 and conduits 32, 36, respectively. The electric circuit of the infeed solenoid 84 associated with the air cylinder valve 74 also is activated, from the main line 102 through said solenoid and line 189, through the untransferred contact B of relay 186 and the transferred contact D of the set control relay 154 to the other main line 122. So, also, is the solenoid 68 for the hydraulic fluid accumulator tank valve 66, positioning the latter to close the high pressure hydraulic conduit 62 from the tank.

Since the error setting relay 124 is energized, its transferred contact C open circuits the slow speed valve solenoids 48. Accordingly, hydraulic fluid under pressure forces the No. 1 saw piston 26 in the infeed direction, i.e., toward the reference straight edge 20, at the fast rate of speed.

Simultaneously with the foregoing the No. 2, 3 and 4 saw selector assemblies 1b, 1c and 1d are in operation. Bypassing the No. 2 saw for the moment, the No. 3 and 4 saws are to be moved away from the reference straight edge 20 to the new positions selected. Since their associated detection potentiometers 140 are so positioned as to cause their associated bottom thyratron tubes 116a and 120a to conduct and activate the respective set selector relays 116 and 120, the corresponding outfeed solenoids 42 associated with the hydraulic control valves 38 for the No. 3 and 4 saw power cylinders 28 will operate to connect the hydraulic supply conduit 34 to the outfeed conduits 32 and to connect the supply conduit 36 to the infeed conduits 30. The pistons 26 and attached Nos. 3 and 4 saws thus are moved away from the reference straight edge at the fast rate of speed.

Returning now to the No. 2 saw, it will be remembered that initially this saw was spaced four inches from the No. 1 saw which, in turn, was spaced four inches from the reference straight edge. Since it is desired that the No. 2 saw now be spaced six inches from the No. 1 saw and the latter is to be moved from four inches to two inches from the reference straight edge, it will be apparent that the No. 2 saw is now in the exact ultimate position desired. However, it will be caused to move from this position and then return to it, by virtue of the error balance arrangement which controls the initial movement of all saws, as follows:

Activation of the error setting relay 124 transfers its contacts E and F to insert at opposite ends of the series chain of selector resistances 134 and make-up potentiometer 172, by means of the wires 191 and 193, a portion of the resistances of the error potentiometers 194 and 196. This effectively makes the grids of the upper tubes 106a–118a and the cathodes of the lower tubes 108a–120a less positive than their respective cathodes and grids, whereby the moving contacts of the associated detection potentiometers 140 adjust to positions more positive than they would with the error resistances removed. Accordingly, in the case of the No. 1 saw detection potentiometer an error balance will be reached before the saw has reached the two inch setting, while in the case of the Nos. 3 and 4 saw detection potentiometers the error balance will be reached after the saws have moved outward beyond their desired setting.

In the case of the No. 2 saw detection potentiometer assembly, it is to be noted that, although the saw is initially positioned at the ultimate set point desired, its associated detection potentiometer is now out of balance by virtue of the inclusion of the error potentiometers. The error is in the direction of the reference straight edge 20, as previously described, resulting in the firing of the lower thyratron tube 108a and activation of the associated set selector relay 108 with consequent activation of the corresponding outfeed solenoid 42 to move the saw to an initial error set position farther from the reference straight edge than ultimately desired.

When each of the detection potentiometers has reached the error balance position, the associated thyratron tube which has not fired will now conduct and activate its associated set selector relay, thereby transferring the associated contacts A and B. Since these contacts are associated with similar contacts of the associated and previously activated set selector relay each pair of now activated relays functions to deactivate hydraulic valve solenoids 40, 42 and return the valves 38 to closed position. All saws now are stopped in their respective error set positions.

It is to be noted that if the hydraulic pump piston 52 progresses forward beyond the longitudinal center of the pump cylinder 50 during the fast portion of the setting cycle, the latter is allowed to complete before the direction is reversed. This is afforded even though the central microswitch contact 94 has been transferred by the arm 90, since the circuit of relay 186 through lines 195 and 197 is broken by the transferred contact D of the activated error setting relay 124. However, upon completion of the fast portion of the set and consequent deactivation of relay 124, the circuit of relay 186 is completed through said contact and the transferred contact D of relay 154. Activation of relay 186 and transfer of its associated contacts effects reversal.

Relay 186 is held energized by this circuit until the central microswitch 94 is released by arm 90. If this occurs during a subsequent fast setting operation, the latter is allowed to complete because relay 186 is held energized by the completed circuit through the untransferred contact of inactive relay 198, transferred contact A of relay 186, line 199 and infeed microswitch 92. Upon completion of the fast setting and consequent deactivation of relay 124, return of its contact D to the position illustrated completes the circuit of relay 198 through transferred contact C of relay 186, line 200 and the central microswitch 94. Activation of relay 198 and opening of its contact effects breaking of the holding circuit for relay 186, whereupon its contacts return to the positions illustrated and the air piston 58 is again driven in the forward direction.

Reversal also is effected when arm 90 closes the forward microswitch 96 and completes the circuit of relay 186 through the untransferred contact of relay 198 and line 201. When this occurs activation of the valve solenoids 40 and 42 is reversed so that hydraulic pressure then is supplied from line 36 to the infeed conduit 30 to continue infeed movement of the piston 26.

Transfer of all of the contacts C of the associated set selector relays 106–120, all of which are now activated, breaks the electric circuit of the error setting relay 124 and also the circuit of the time delay relay 104. However, this latter relay is of the delayed break type, and thus its contact A remains transferred temporarily by mechanical delay.

Return of contact B of the error setting relay 124 opens the electric circuit of the set complete relay 182, whereupon its associated contacts open the electric circuits of the associated set selector relays 106–120.

Time delay relay 202 (FIG. 2) now becomes energized by completion of its circuit from the main line 102 through said relay and the closed contact B of inactivated relay 124, thence through the transferred contact D of activated relay 126, to the other main line 122. However, this time delay relay is of the delayed make type, and the amount of delay is chosen to permit complete deionization of the thyratron tubes, the time being about ½ second. When contact B of this relay 202 transfers, it completes the electric circuit of the set complete relay 182, whereupon the associated contacts transfer to complete the circuits of the set selector relays.

It should now be remembered that the initial settings of the saws were made with error potentiometers 194 and 196 associated with the detection potentiometers 140, resulting in the setting of the saws a distance farther removed from the reference straight edge 20 than desired. With deactivation of the error setting relay 124 and return of the associated contacts E and F to the positions shown, the total resistance of the error potentiometer 196 is now included, while the entire resistance of the other error potentiometer 194 is shunted. Accordingly, the error settings of the contacts of the detection potentiometers 140 all are displaced in the same direction from matching the associated set selector resistances 134, such that all of the upper thyratron tubes are caused to conduct. The associated set selector relays 106, 110, 114 and 118 thus are energized, transferring their associated contacts and activating the infeed solenoids 40 associated with each of the hydraulic control valves 38, whereby to drive the pistons 26 in the infeed direction, i.e., toward the reference straight edge 20.

Since the error setting relay 124 now is deactivated, its closed contact C completes the electric circuit of the slow feed solenoids 48 through the line 203 and the transferred contact C of the relay 126 and the edger roll safety switches 176, 178. Accordingly, the slow feed valves 44 are closed, requiring that the hydraulic fluid ahead of the pistons 26 be returned through the restrictor valves 46. In this manner, the saws are moved in the infeed direction slowly to the final set point.

As the final set point of each saw is reached, determined by the matching of the detection potentiometers 140 with the associated set selector resistances 134, all of the lower thyratron tubes conduct and activate their associated set selector relays, with consequent deactivation of the infeed solenoids 40.

The final set point of each saw having thus been reached, and the predetermined time delay for contact A of the inactivated time delay relay 104 having expired, said contact returns to the normal position illustrated, thereby breaking the circuit of the set complete relay 182. The resulting return of the associated contact E to the position illustrated breaks the circuit of the voltage sensing relay 126. Return of contact D of this relay 126 to the position illustrated breaks the circuit of time delay relay 202, whereupon return of its contact B to the position illustrated breaks the circuit of the set complete relay 182 and deenergizes all of the set selector relays 106–120.

Upon inactivation of the set selector relays and consequent return of their associated contacts C to the positions illustrated, the electric circuit of the time delay relay 104 is again completed.

The return of contact B of deactivated relay 126 to the position illustrated breaks the circuit of the motor brake 166 and completes the circuit of the voltage make-up motor 164 through the transferred homing contact 156 and the transferred contact A of the reenergized time delay relay 104. The motor remains energized until its driven cam 158 completes its cycle, whereupon the homing contact 156 is returned to the position illustrated, breaking the circuit of the motor. In this position of the homing cam, the rotary contact 170 of the voltage make-up potentiometer 172 is returned to its zero position illustrated. The complete setting cycle thus is completed.

Figure 2:
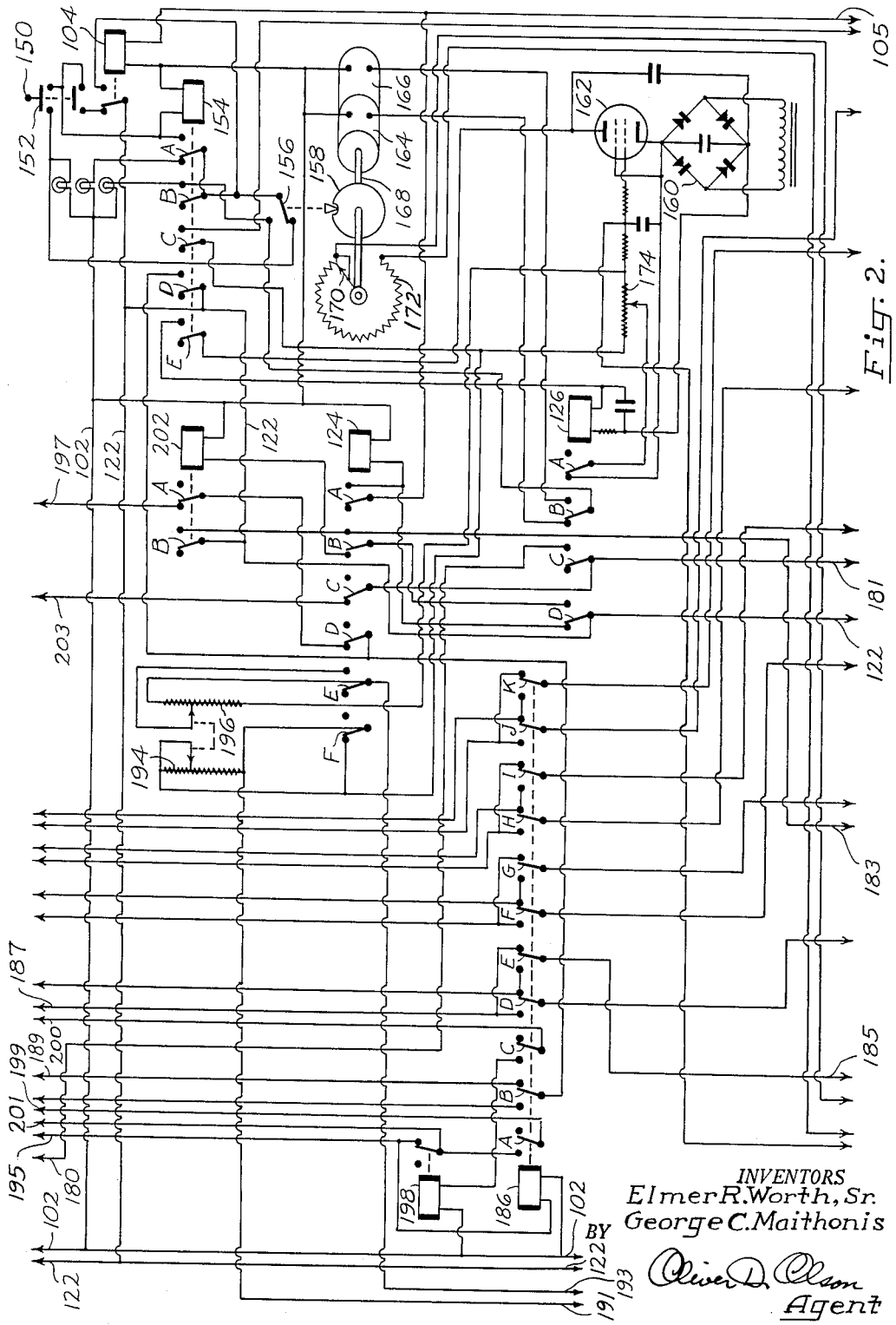
FIGS. 2 and 3 are schematic electrical diagrams which continue the electrical circuitry of FIG. 1.

It is to be noted that the circuit assembly shown in FIGS. 2 and 3 may be located either immediately adjacent the assembly shown in FIG. 1, or at any other position conveniently remote therefrom, since the operative connection between the assemblies is made simply by flexible electric conductors.

Although the foregoing description has related to a sawmill edger, it will be apparent to those skilled in the art that the setworks may be utilized to control the independent setting of a plurality of members, other than saws, and that the number of members to be so controlled simply requires a corresponding number of control circuits and power sources. A single element, such as a resaw, also may be controlled, and the element so controlled may be the saw or it may be the reference straight edge.

In the case of a re-saw, which characteristically requires setting to but a very few positions, for example, three or four, each of the saw push button assemblies 134, 136 illustrated in FIG. 3 may conveniently be replaced by a potentiometer, the total resistance of each representing the total opening of the re-saw and the movable contact of each being positioned to correspond to the desired spacing between the saw and the straight edge. Thus the voltage makeup potentiometer 172 and associated motor 164, as well as the voltage sensing relay 126 and associated circuit may be omitted. It will be understood, in addition, that a single hydraulic power cylinder 28 and control valve assembly is used and the associated infeed and outfeed valve solenoids will be controlled by whichever one of the set potentiometer assemblies is selected for any given set.

The hydraulic power assembly may be replaced by reversible electric motors or motor-clutch systems, the reversible operation of which may be controlled by relays in place of the infeed and outfeed solenoids illustrated. The thyratron tubes may be replaced by transistors, with appropriate changes in circuitry, and the term electron discharge means employed in the claims is intended to include both types. With appropriate modification the error potentiometers may be arranged in the circuit of the detection potentiometers, rather than in the set selector chain.

The remote control system described hereinbefore may be utilized to control various operations other than the movement of one or more saws or other members. For example, the detection potentiometers may be arranged to vary their resistances in response to variations in weight, to afford use of the system in the automatic dispensing of varying amounts of a plurality of substances, the desired amount of each having been previously established by proper selection of the set select or resistances and the matching of these serving to stop the feed of the various substances. Similarly, variations in light, heat or other physical quantity may be utilized to vary the detection potentiometer resistances for the control of associated devices.

It will be apparent to those skilled in the art that the foregoing and other changes in the details of construction described hereinbefore may be made without departing from the spirit of this invention and the scope of the appended claims.

Having now described our invention and the manner in which it may be used, what we claim as new and desire to secure by Letters Patent is:

1. A set works for moving a member relative to a reference, comprising electrically actuated power means for the movable member, electrical power actuator means having an electric circuit, selector resistance means providing an electric selector signal representing a predetermined distance of the member from the reference, variable detecting resistance means operable by the power means to provide an electric detection signal, control means including electron discharge means having an electric circuit including the selector and detecting resistance means associated with the power actuator means, the control means being operable on the actuator means to activate the power means until, and to stop the same when, the selector and detection signals reach a predetermined relative relationship, error signal producing resistance means in the electric circuit of the electron discharge means and operatively associated with one of the selector and detecting resistance means and providing an electric error signal which combines with the associated electric selector signal to move the member initially to an error position different from the desired set position, means operable by the control means upon movement of the member to the error position to remove the error signal, whereby to reactivate the power means and move the member until the predetermined relative relationship of the selector and detection signals again is reached, and means for reversing the selector resistance means in the circuit for changing the reference to the other side of the movable member.

2. A setworks for moving a member relative to a reference, comprising electrically actuated reversible power means for the movable member, electrical forward and reverse power actuator means each having an electric circuit, variable selector resistance means providing an electric selector signal representing a predetermined distance of the member from the reference, variable detection resistance means operable by the power means to provide an electric detection signal control means including electron discharge means having an electric circuit including the selector and detection resistance means associated with each power actuator means, the control means being operable on the actuator means to activate the power means until, and to stop the same when, the selector and detection signal reach a predetermined relative relationship, error signal producing resistance means in the electric circuit of the electron discharge means and operatively associated with one of the selector and detecting resistance means and providing an electric error signal which combines with the associated electric selector signal to move the member initially to an error position different from the desired set position and on a predetermined side of the latter relative to the reference, means operable by the control means upon movement of the member to the error position to remove the error signal, whereby to reactivate the power means and move the member until the predetermined relative relationship of the selector and detection signals again is reached, and means for reversing the selector resistance means in the circuit for changing the reference to the other side of the movable member.

3. An electric system for controlling a plurality of identical physical quantities each adjustable by an electrically actuated device, the system comprising electrical actuator means for each device and each having an electric circuit, selector means associated with each actuator means and each providing an electric selector signal representing a predetermined magnitude of said physical quantity, means combining the selector means for providing a total electric selector signal representing the total magnitude of said physical quantities, the selector combining means including variable makeup signal means associated with the combined selector means for providing an electric makeup signal supplementing the total selector signal to provide an electric magnitude signal representing the maximum total magnitude of physical quantity for said plurality of quantities, electrically actuated drive means for the makeup signal means, reference means providing an electric reference signal representing the maximum total magnitude of physical quantity for said plurality of quantities, sensing means interconnecting the reference means and the combined selector and makeup means and operable to activate the makeup signal drive means until, and to stop the same when, the magnitude signal matches the reference signal, variable detecting means associated with each selector means and each operable by the associated physical quantity to provide an electric detection signal, and control means associated with each actuator means and operatively interconnecting the associated selector and detecting means, each control means being operable on its associated actuator means to maintain the associated device in one condition of operation until, and to change the operating condition of the device when, the selector and detection signals reach a predetermined relative relationship.

4. The system of claim 3 including error signal producing means operatively associated with all of one of the selector and detecting means and providing an electric error signal which combines with the associated electric selector signal to effect the change of operating conditions when the physical quantities have been adjusted to error magnitudes different from the desired magnitudes, and means operable by all of the control means upon attainment of said error magnitude to remove the error signal, whereby to reactivate all of the devices until the respective predetermined relative relationships of the associated selector and detection signals again are reached.

5. A setworks for moving a plurality of members relative to each other, wherein the members are arranged in a succeeding order relative to a reference, the setworks comprising electrically actuated reversible power means for each movable member, electrical forward and reverse power actuator means for each power means and having an electric circuit, selector resistance means associated with each power means and each providing an electric selector signal representing a predetermined distance of the associated member from its reference, means combining the selector means for providing a total electric selector signal representing the total distance between the reference and the first member and between each succeeding member, variable detecting resistance means associated with each selector means and each operable by the associated power means to provide an electric detection signal, and control means associated with each power actuator means and including electron discharge means having an electric circuit including the associated selector and detecting resistance means, each control means being operable on its associated actuator means to activate the associated power means until, and to stop the same when, the selector and detection signals reach a predetermined relative relationship, and means for reversing the selector resistance means in each circuit for changing the reference to the other side of the movable member.

6. The setworks of claim 5 including error signal producing means operatively associated with all of one of the selector and detecting means and providing an electric error signal which combines with the associated electric selector signal to move the members initially to error positions different from the desired set positions, and means operable by all of the control means upon movement of all members to their respective error positions, to remove the error signal, whereby to reactivate all of the power means and move the members until the respective predetermined relative relationships of the associated selector and detection signals again are reached.

7. The setworks of claim 6 wherein the error signal producing means is arranged to provide an electric error signal which is combined with the associated electric selector signal to move the members initially to error positions removed from the desired set position and on a predetermined side of the latter relative to the reference.

8. The setworks of claim 6 including means operable by each control means upon movement of the members to the error position to reduce the speed rate of movement of the members upon reactivation of the power means.

9. A setworks for moving a plurality of members relative to each other, wherein the members are arranged in a succeeding order relative to a reference, the setworks comprising electrically actuated reversible power means for each movable member, electrical forward and reverse power actuator means for each power means and having an electric circuit, selector means associated with each power means and each providing an electric selector signal representing a predetermined distance of the associated member from its reference, means combining the selector means for providing a total electric selector signal representing the total distance between the reference and the first member and between each succeeding member, the selector combining means including variable makeup signal means associated with the combined selector means for providing an electric makeup signal supplementing the total selector signal to provide an electric distance signal representing the maximum capable distance between the reference and the last succeeding member, electrically actuated drive means for the makeup signal means, reference means providing an electric reference signal representing the maximum capable distance between the reference and the last succeeding member, sensing means operatively interconnecting the reference means and the combined selector and makeup means and operable to activate the makeup signal drive means until, and to stop the same when, the distance signal matches the reference signal, variable detecting means associated with each selector means and each operable by the associated power means to provide an electric detection signal, and control means associated with each power actuator means and operatively interconnecting the associated selector and detecting means, each control means being operable on its associated actuator means to activate the associated power means until, and to stop the same when, the selector and detection signals reach a predetermined relative relationship.

10. The setworks of claim 9 wherein the makeup signal means comprises a potentiometer driven by an electric motor.

11. The setworks of claim 9 wherein the sensing means includes electron discharge means having an electric circuit and the selector means, makeup means and reference means comprise resistances in said circuit.

12. A setworks for moving a plurality of members relative to each other, wherein the members are arranged in a succeeding order, the setworks comprising electrically actuated reversible power means for each movable member, electrical forward and reverse power actuator means for each power means and each having an electric circuit, variable selector means associated with each power means for providing a total electric selector signal representing a predetermined distance of the associated member from its referencce, means combining the selector means for providing a total electric selectcor signal representing the total distance between the reference and the first member and between each succeeding member, variable makeup signal means associated with the combined selector means for providing an electric makeup signal supplementing the total selector signal to provide an electric distance signal representing the maximum capable distance between the reference and the last succeeding member, electrically actuated drive means for the makeup signal means, reference means providing an electric reference signal representing the maximum capable distance between the reference and the last succeeding member, sensing means operatively interconnecting the reference means and the combined selector and makeup means and operable to activate the makeup signal drive means until, and to stop the same when, the distance signal matches the reference signal, variable detecting means associated with each selector means and each operable by the associated power means to provide an electric detection signal, control means associated with each power actuator means and operatively interconnecting the associated selector and detecting means the control means being operable to activate the associated power means until, and to stop the same when, the selector and detection signals reach a predetermined relative relationship, error means operatively associated with all of one of the selector and detecting means and providing an electric error signal which combines with the associated signal to move each member initially to an error position different from the desired set position and on a predetermined side of the latter relative to the reference, and means operable by the control means upon movement of the members to the error positions to remove the error signal, whereby to reactivate all of the power means and move the members until the predetermined relative relationship of the associated selector and detection signals again is reached.

References Cited by the Examiner

UNITED STATES PATENTS

| | | | |
|---|---|---|---|
| 2,460,276 | 2/49 | Bernas | 318—20.250 |
| 2,543,950 | 3/51 | Yardeny et al. | 318—29 |
| 2,657,347 | 10/53 | Bristol | 318—19 |
| 2,714,906 | 8/55 | Peterson | 318—466 X |
| 2,738,493 | 3/56 | Mesh | 318—29 X |
| 2,870,386 | 1/59 | Kelling | 318—20.520 |
| 2,969,094 | 1/61 | Johnson | 318—29 X |
| 2,970,617 | 2/61 | Mater | 143—120.1 |
| 2,992,661 | 7/61 | Burelbach | 143—37.2 |
| 2,999,197 | 9/61 | Gensman | 318—103 X |
| 3,114,870 | 12/63 | Moser et al. | 318—20.250 |

FOREIGN PATENTS 567,994   12/58   Canada.

ORIS L. RADER, *Primary Examiner.*